United States Patent
Kondo et al.

(10) Patent No.: US 6,617,999 B2
(45) Date of Patent: Sep. 9, 2003

(54) RADAR SYSTEM FOR DETECTING A TARGET AND CONTROLLING THE SCANNING UNIT

(75) Inventors: Nobuhiro Kondo, Takatsuki (JP); Yukio Takimoto, Yamato (JP); Takatoshi Kato, Mino (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/175,078

(22) Filed: Jun. 20, 2002

(65) Prior Publication Data

US 2003/0011507 A1 Jan. 16, 2003

(30) Foreign Application Priority Data

Jul. 12, 2001 (JP) .................................... 2001-212700
Mar. 12, 2002 (JP) .................................... 2002-067214

(51) Int. Cl.[7] ............................................. G01S 13/73
(52) U.S. Cl. ............................ 342/70; 342/71; 342/72; 342/74
(58) Field of Search ............................ 342/70, 71, 72, 342/73, 74, 81, 107, 109; 340/435, 436

(56) References Cited

U.S. PATENT DOCUMENTS

| | | | | |
|---|---|---|---|---|
| 4,562,439 A | * | 12/1985 | Peralta et al. ................. | 342/81 |
| 5,731,779 A | * | 3/1998 | Kikuchi ....................... | 342/70 |
| 6,055,042 A | * | 4/2000 | Sarangapani ................ | 356/4.01 |
| 6,151,539 A | * | 11/2000 | Bergholz et al. .............. | 701/25 |
| 2002/0036584 A1 | * | 3/2002 | Jocoy et al. .................. | 342/70 |

FOREIGN PATENT DOCUMENTS

JP 11-339198 10/1999

OTHER PUBLICATIONS

Karl Roulston, "Angel discrimination in the ARSR–4 joint use radar", Radar Conference, Record of the 1993 IEEE National, Apr. 20–22, 1993, Page(s): 156–162.*

Walter Nagy et al., "System and parametric tradeoffs of forward looking automotive radar systems", Radar Conference, Proceedings of the 1996 IEEE National, May 13–16, 1996 Page(s): 19–26.*

* cited by examiner

Primary Examiner—Thomas H. Tarcza
Assistant Examiner—Isam Alsomiri
(74) Attorney, Agent, or Firm—Keating & Bennett, LLP

(57) ABSTRACT

A radar system includes a detection-control circuit for transmitting and receiving the beam of a millimeter-wave signal for detecting a relative position and a relative speed to a target, and a scanning unit for scanning the direction of the beam over a predetermined range. The state of the scanning unit can be switched between a resting state wherein scanning is stopped and the beam is directed towards the center of the scanning range while the detection-control circuit continues detection control, and a scanning state wherein the direction of the beam is scanned over a predetermined range.

17 Claims, 5 Drawing Sheets

RADAR SYSTEM FOR DETECTING A TARGET AND CONTROLLING THE SCANNING UNIT

BACKGROUND OF THE INVENTION

1. Field of the Invention

The present invention relates to a radar system for detecting a target such as a vehicle traveling in front of or behind another vehicle.

2. Description of the Related Art

A vehicle including a following-distance alarm system that issues an alarm when the distance between the vehicle and another vehicle traveling in front of the vehicle is decreased, and that performs braking control as required is disclosed in Japanese Unexamined Patent Application Publication No. 11-339198.

In the following-distance alarm system, the operation of a radar system is stopped when the speed of the vehicle is decreased, in order to extend the life of a laser diode used for a scan-laser radar system. The radar is activated when the movement of the vehicle traveling in front is detected by using a sub-sensor, such as a CCD camera or an ultrasonic sensor.

In the following-distance alarm system, however, the operation of the radar is stopped when the speed of the vehicle is less than a predetermined speed. Therefore, another sub-sensor designed specifically for detecting a start of the vehicle traveling in front is needed. Accordingly, the configuration of the alarm system becomes complicated, and the cost is increased. Further, a target is detected over a predetermined range by scanning the direction of a beam of a detection signal. Sometimes, such scanning becomes unnecessary according to the vehicle speed.

SUMMARY OF THE INVENTION

In order to overcome the problems described above, preferred embodiments of the present invention provide a radar system which eliminates the above-described sub-sensor and which uses beam scanning very effectively.

According to a preferred embodiment of the present invention, a radar system includes a detection-control circuit for transmitting and receiving a detection signal and for detecting a relative position or a relative speed to a target, a scanning unit for scanning the direction of a beam of a detection signal over a predetermined range, and a beam-scanning control unit. The beam-scanning control unit switches the state of the scanning unit between a resting state wherein the direction of the beam is fixed to a predetermined position, for example, the center position in the predetermined range, while the detection-control circuit continues detection controlling, and a scanning state wherein the direction of the beam is scanned over the predetermined range. Accordingly, detection controlling can be performed when beam scanning is stopped, whereby a sensor designed specifically for detecting the start of a vehicle traveling in front becomes unnecessary, for example.

Preferably, in the radar system, the beam-scanning control unit switches the scanning unit into the scanning state when the moving speed of a vehicle in which the radar system is mounted is equal to or greater to a predetermined speed. Further, the beam-scanning control unit switches the scanning unit into the resting state when the moving speed is less than the predetermined speed. Accordingly, beam scanning is performed only when the vehicle is traveling at a high speed, and is stopped when the vehicle is traveling at a low speed in order to prolong the life of the scanning unit. As a result, the life of the radar system is prolonged, and the reliability thereof is easily increased.

Preferably, in the radar system, the beam-scanning control unit switches the scanning unit into the scanning state when the vehicle having the radar system is traveling on a highway, and switches the scanning unit into the resting state when the vehicle is not traveling on a highway. Accordingly, beam scanning is performed only in case of necessity and is stopped at other times, so that the life of the scanning unit is prolonged.

Preferably, the beam-scanning control unit switches the scanning unit into the scanning state when the detection-control circuit detects a new target or the relative movement of the target during the resting state of the scanning unit. Accordingly, beam scanning can be automatically started and can be stopped until a need arises. Thus, the life of the scanning unit is prolonged.

Preferably, in the radar system, the direction of the beam scanned by the scanning unit is in a horizontal plane, or in a plane at a predetermined tilt angle. Accordingly, the moving target can be captured over the scanning range, and can be captured for a relatively long time.

Preferably, in the radar system, the direction of the beam scanned by the scanning unit is in a substantially vertical plane. Accordingly, the existence range of the target in the scanning range, that is, the height of the target can be detected. Further, the type of the target can also be identified.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Figure 1:
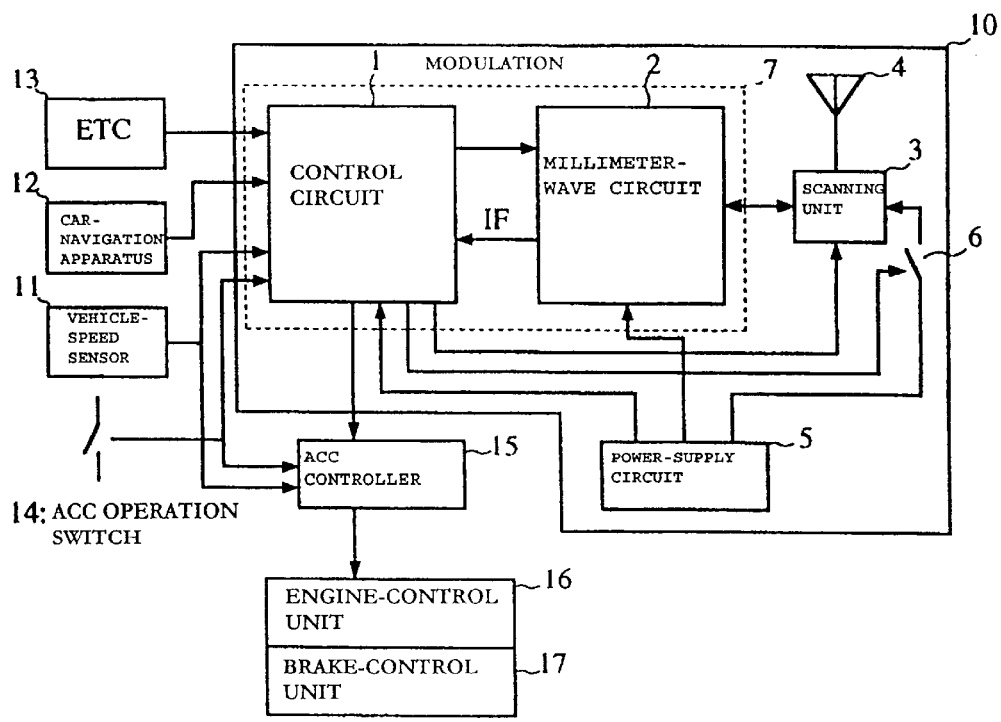
FIG. 1 is a block diagram illustrating the configuration of a radar system according to a preferred embodiment of the present invention.

The configuration of a radar system mounted in a vehicle according to preferred embodiments of the present invention will now be described with reference to the drawings. As shown in FIG. 1, the radar system preferably includes a radar unit 10, a vehicle-speed sensor 11, a car-navigation system 12, an electronic toll collection (ETC) system 13, an ACC operation switch, an ACC controller 15, an engine-control unit 16, and a brake-control unit 17. The radar unit 10 preferably includes a control circuit 1, a millimeter-wave circuit 2, a scanning unit 3, an antenna 4, a power-supply circuit 5, and so forth. The control circuit 1 and the millimeter-wave circuit 2 define a detection control circuit 7. The millimeter-wave circuit 2 modulates an oscillation frequency using an FMCW method by using a modulation signal received from the control circuit 1, outputs a transmission signal to the antenna 4 via the scanning unit 3, and transmits a reception signal as an IF signal to the control circuit 1. The scanning unit 3 directs beams from the antenna 4 over a predetermined range by a mechanical reciprocating movement, as described later.

The control circuit 1 transmits the modulation signal to the millimeter-wave circuit 2, obtains the relative distance and relative speed to a target on the basis of the IF signal received from the millimeter-wave circuit 2, and notifies the ACC controller 15 of the relative distance and the relative speed. Further, the control circuit 1 reads inputs received from the vehicle sensor 11, the car-navigation system 12, the ETC system 13, and the ACC operation switch 14, and controls the scanning unit 3 and the ON/OFF state of the power supply of the scanning unit 3.

The power circuit 5 supplies power to the control circuit 1, the millimeter-wave circuit 2, and the scanning unit 3.

The ACC controller 15 performs automatic cruise controlling on the basis of the vehicle speed obtained by the vehicle sensor 11, and the relative distance and the relative speed provided by the control circuit 1. For example, the ACC controller 15 provides control data to the engine-control unit 16 and to the brake-control unit 17 so as to maintain the distance between the vehicle and a vehicle in front at a predetermined level. Further, the ACC controller 15 provides other control data to the engine-control unit 16 and to the brake-control unit 17 to prevent a collision between the vehicle and the vehicle in front, or a target ahead of the vehicle.

The engine-control unit 16 and the brake-control unit 17 perform engine control and brake control on the basis of the control data given by the ACC controller 15.

The ACC operation switch 14 is provided to switch the operation of the ACC controller 15 between activated and deactivated.

Figure 2:
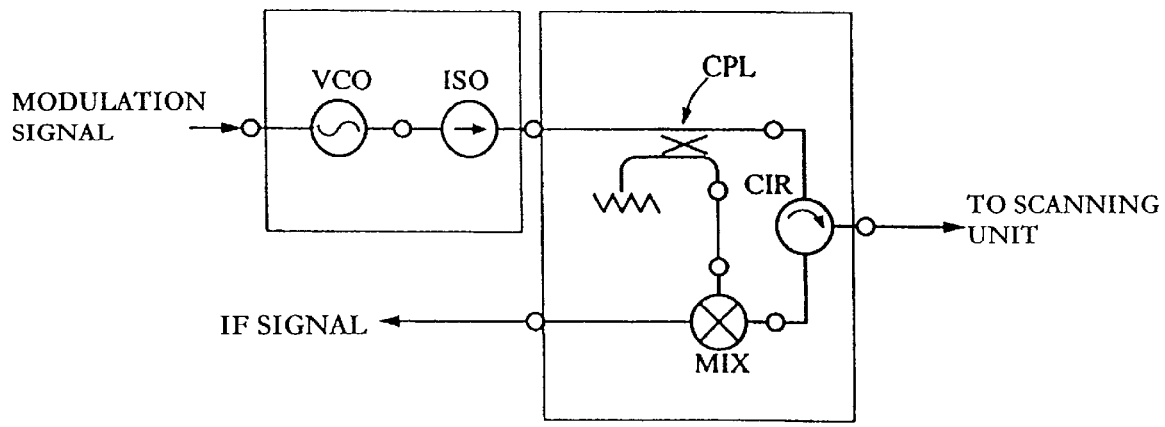
FIG. 2 illustrates the configuration of a millimeter-wave circuit of the radar system shown in FIG. 1.

FIG. 2 is a circuit diagram illustrating the configuration of the millimeter-wave circuit 2 shown in FIG. 1. In this drawing, VCO indicates a voltage-controlled oscillator including a Gunn diode, a varactor diode, and so forth, and ISO indicates an isolator to prevent a reflected signal from returning to the VCO. CPL indicates a coupler, which is a directional coupler including an NRD guide for extracting a portion of the transmission signal as a local signal. CIR is a circulator that gives the transmission signal to the scanning unit 3, and that transfers a reception signal to a mixer (MIX). The MIX mixes the reception signal and the local signal, and outputs an IF signal.

Figure 3:
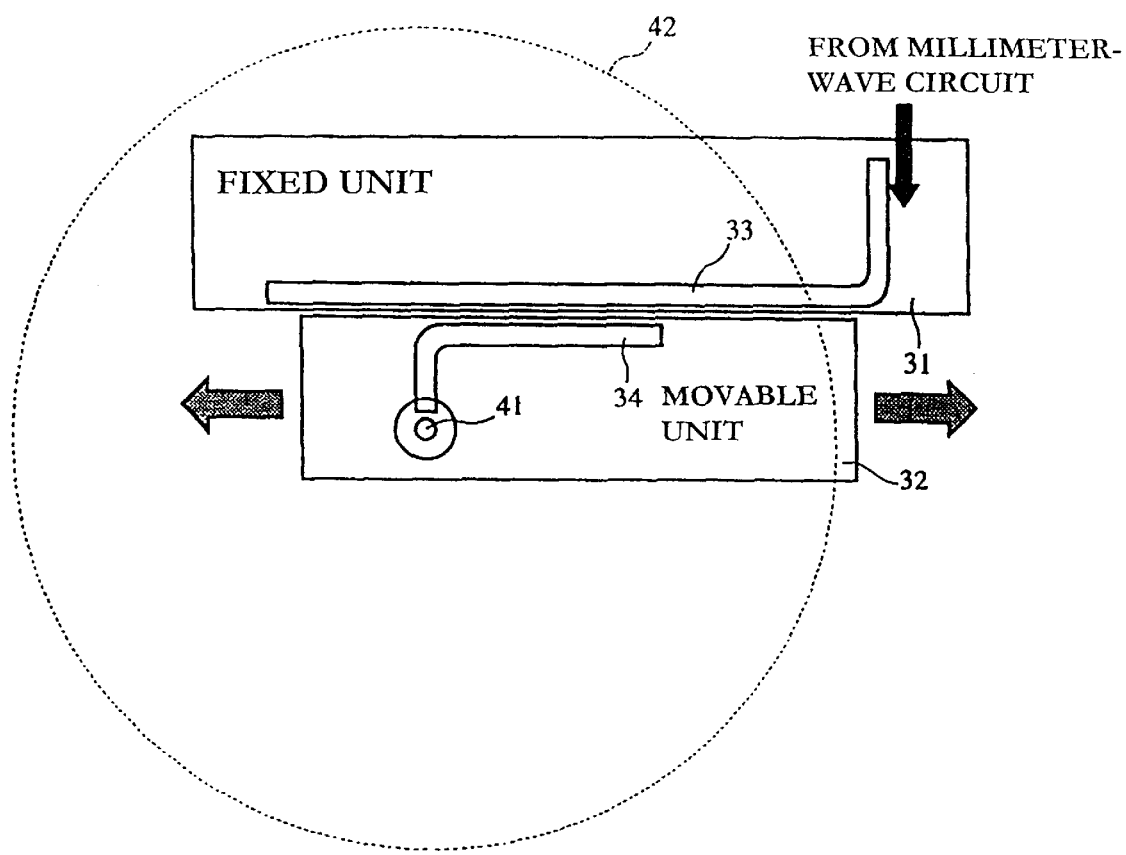
FIG. 3 shows the configuration of a scanning unit and an antenna of the radar system shown in FIG. 1.

FIG. 3 illustrates the configuration of the scanning unit 3 and the antenna 4 shown in FIG. 1. A dielectric strip 33 and a dielectric strip 34 are disposed on a lower conductor 31 and a lower conductor 32, respectively. An upper conductor, which is not shown in the drawing, is disposed on each of the dielectric strip 33 and the dielectric strip 34. Accordingly, two NRD guides are provided, and two slots are coupled at a portion where the dielectric strips 33 and 34 are adjacent and substantially parallel to each other, whereby a directional coupler is defined.

At one end of the dielectric strip 34, a primary radiator 41 including a dielectric resonator is provided. On the upper conductor on the dielectric strip 34, an aperture is formed for radiating and launching an electromagnetic wave into the primary radiator 41 in a vertical direction. A dielectric lens 42 is provided so that the primary radiator 41 substantially becomes the focal point of the dielectric lens 42.

In FIG. 3, the NRD guide including the lower conductor 32, the upper conductor opposing the lower conductor 32, and the dielectric strip 34 provided therebetween, and the primary radiator 41 are movable units. The other NRD guide including the lower conductor 31, the upper conductor opposing the lower conductor 31, and the dielectric strip 33 provided therebetween is a fixed unit. The dielectric lens 42 is also fixed, and the relative position of the primary radiator 41 to the dielectric lens 42 is moved in directions shown by the arrows in the drawing, whereby beam scanning is performed.

In the scanning unit shown in FIG. 3, the movable lower conductor 32 linearly moves by using a rotary linear motion inverter including a pulse motor, a worm gear, and so forth, or by using a linear pulse motor. Accordingly, the position of the lower conductor 32 can be controlled on the basis of the number of pulse steps for the linear pulse motor or the pulse motor. A home position sensor is provided for detecting the initial position of the movable lower conductor 32, when the conductor 32 is at a predetermined home position.

In FIG. 3, the transmission signal is transmitted along an electromagnetic wave that is transferred from the millimeter-wave circuit 2 to the primary radiator 41 via the directional coupler, and that is radiated on a paper in a vertical direction via the dielectric lens 42. A reflected wave from a target is launched in the primary radiator 41, and a reception signal propagates through the NRD guide of the movable unit and through the NRD guide of the fixed unit via the directional coupler, and is supplied to the millimeter-wave circuit 2.

Figure 4:
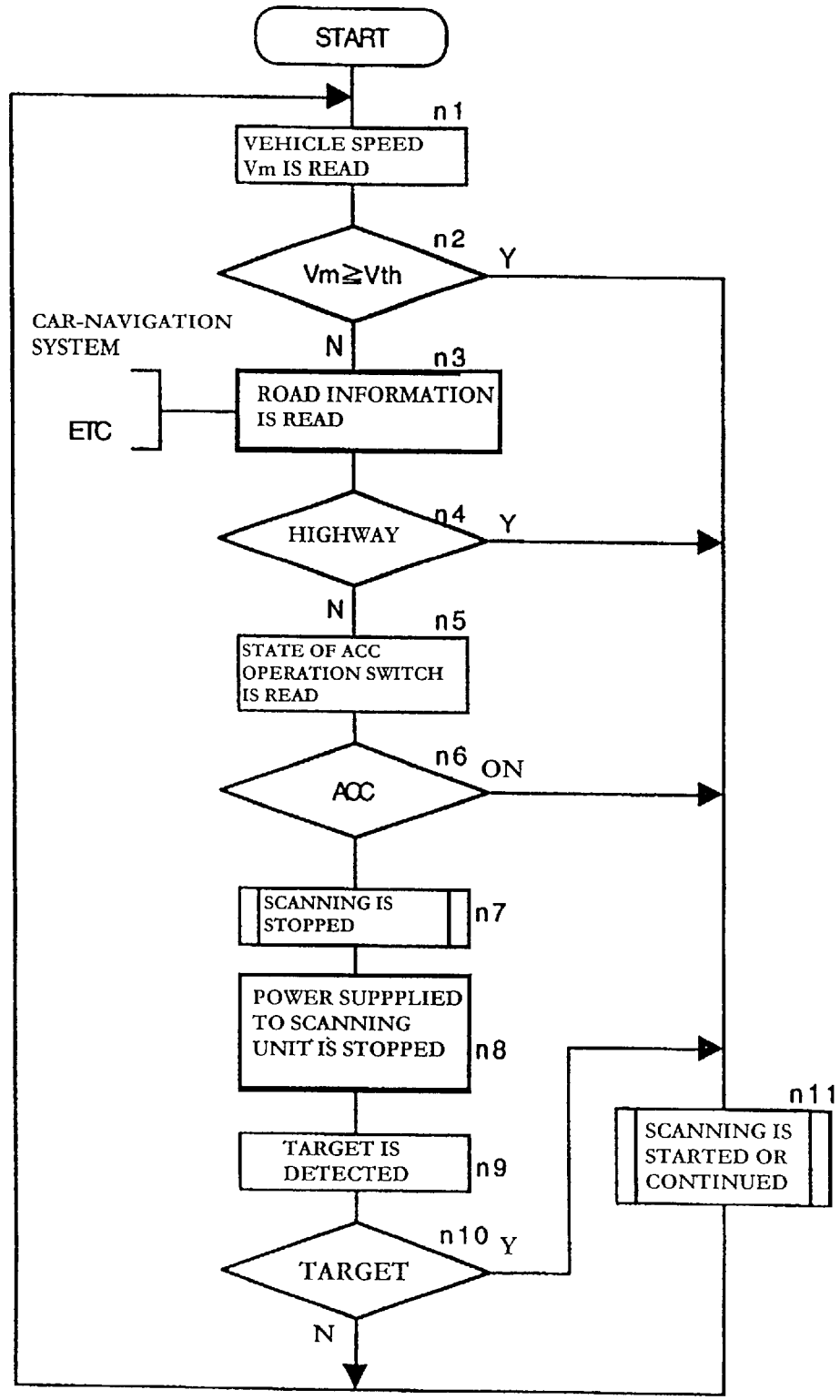
FIG. 4 is a flowchart of processing steps performed by a control circuit of the radar system according to preferred embodiments of the present invention.

FIG. 4 is a flowchart illustrating the processing steps performed by the control circuit 1 shown in FIG. 1. First, the vehicle speed Vm is read from the vehicle sensor 11 (Step n1). When the vehicle speed Vm is predetermined threshold value Vth or more, the scanning unit 3 starts scanning. If the scanning unit 3 had already started scanning, the scanning is continued (Steps n2 to n11). If the vehicle speed Vm is less than the threshold value Vth, road information is read from the car-navigation system 12 or from the ETC 13 shown in FIG. 1 (Step n3). The road information can be read from the car-navigation system 12, which always has the information of the road on which the vehicle is traveling. State information of the vehicle can be read from the ETC 13 for determining the state of the vehicle, that is, whether the vehicle enters a highway or exits therefrom, on the basis of a signal transmitted from an antenna provided near a toll station of the highway. When the vehicle is traveling on the highway, the scanning unit 3 starts or continues scanning (Steps n4 to n11). When the vehicle is not traveling on the highway, the state of the ACC operation switch is read (Step n5). When it is determined that the ACC controller should be active, the scanning unit 3 starts or continues scanning (Steps n6 to n11).

However, when the vehicle speed Vm is less than the threshold value Vth, the vehicle is not traveling on the highway, and the ACC operation switch is off, the scanning unit 3 stops scanning (Step n7). In this step, direction data is given to the scanning unit 3 so as to allow the beams to be directed towards the front. Accordingly, the beams are directed towards the front (the center of the scanning range) and stop. Subsequently, the power supplied to the scanning unit 3 is stopped (Step n8).

Although the power supplied to the scanning unit 3 is stopped, a target in front of the vehicle can be detected since the operation of the control circuit 1 and the millimeter-wave circuit 2 continues. When a new target is detected in such a state, or when the target moves relative to the radar, the scanning unit 3 starts scanning (Steps n9 to n11).

By repeating the above-described processing, switching between the scanning state and the resting state, and power-supply control for the scanning unit 3 can be automatically performed.

Figure 5A:
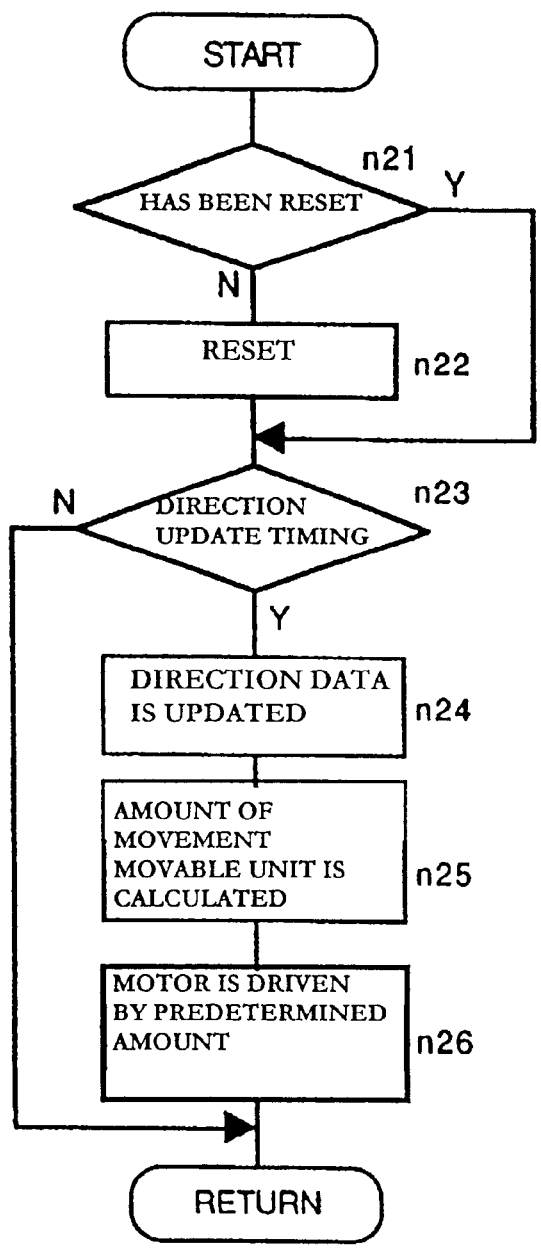
FIG. 5A is another flowchart of processing steps performed by the control circuit of FIG. 4.
Figure 5B:
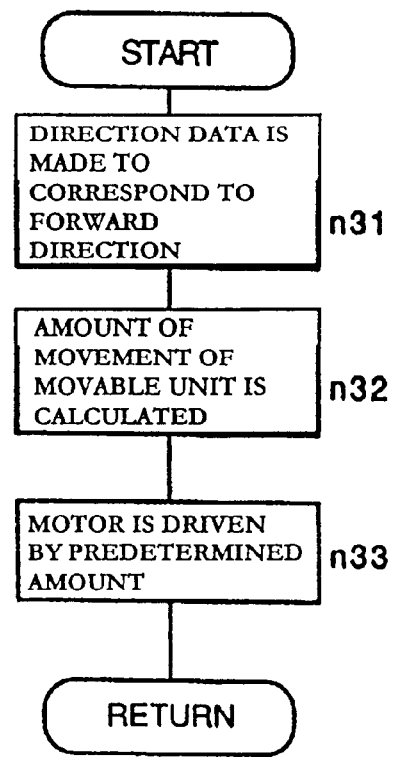
FIG. 5B is another flowchart of processing steps performed by the control circuit of FIG. 4.

FIGS. 5A and 5B are flowcharts illustrating processing steps performed by the control circuit 1 relating to control of the scanning unit 3. Processing steps n21 to n26 shown in FIG. 5A correspond to Step n11 shown in FIG. 4, and processing steps n31 to n33 in FIG. 5B correspond to Step n7 shown in FIG. 4.

As shown in FIG. 5A, when the state of the scanning unit 3 is not reset before starting or continuing the scanning, the movable unit shown in FIG. 3 is moved in a direction towards the home position. When the home position sensor is ON, pulses are driven by a predetermined number of steps. Subsequently, the movable unit is moved so that the beams are directed towards the front (Steps n21 to n22). Afterwards, when the direction of the beams needs to be updated, the data indicating the direction of the beams is updated (Steps n23 to n24). Then, the amount of movement of the movable unit corresponding to the updated direction is calculated as the number of pulses of the pulse motor (Step n25), and the pulse motor is driven by this number of pulses (Step n26).

When scanning had already been started after resetting, the processing at Step n22 is not performed (Step n23 to Return).

Thus, by sequentially changing the direction data indicating the directions in which the beams should be directed, the beam scanning is performed over the predetermined range.

FIG. 5B shows the processing steps performed to stop scanning. First, the value of the direction data is made to correspond to the forward direction (Step n31), and the amount of movement of the movable unit corresponding to the direction is calculated as the number of pulses of the pulse motor (Step n32), and the pulse motor is driven by this number of steps (Step n33). Accordingly, the beams are directed towards the front and stop.

Figure 6A:
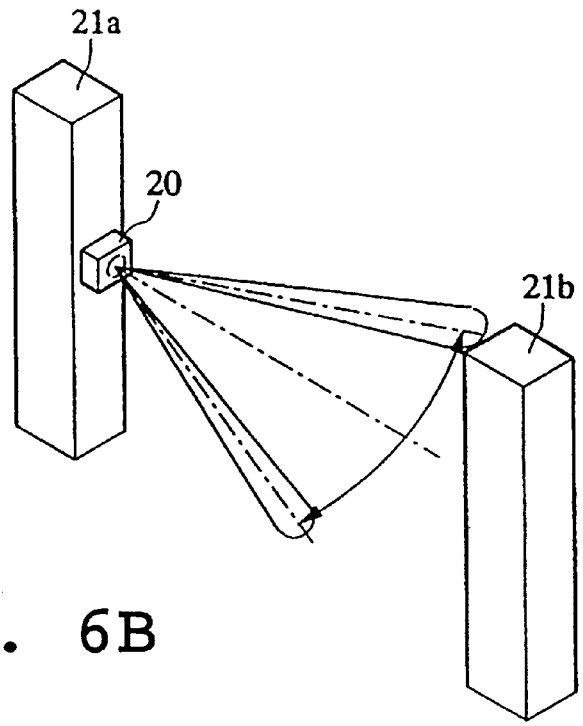
FIG. 6A illustrates an example wherein the radar system according to preferred embodiments of the present invention is attached to a fixed object.
Figure 6B:
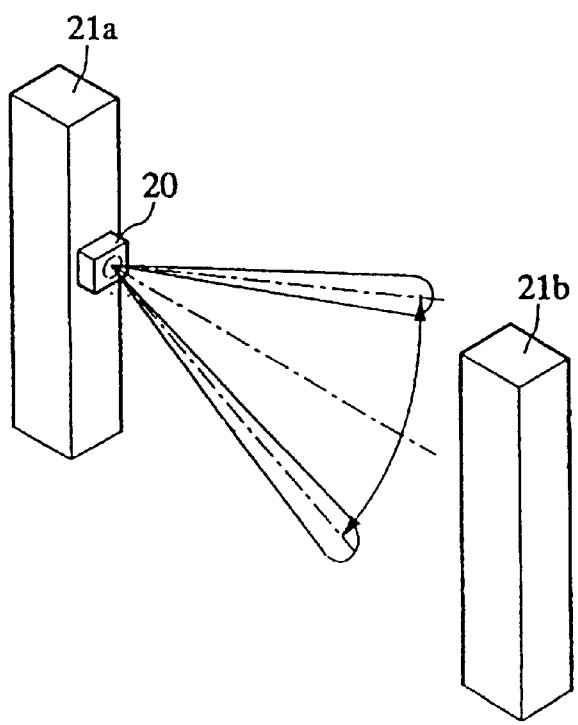
FIG. 6B also illustrates an example wherein the radar system according to preferred embodiments of the present invention is attached to a fixed object.

In the above-described example, the radar system is mounted in a moving body, such as a vehicle. However, the radar system may be attached to a fixed object. For example, FIGS. 6A and 6B show a radar system for monitoring a target passing between gateposts 21*a* and 21*b*, such as a person, a small animal, and so forth. A radar system 20 of this example, which directs a radar beam functioning as a detection signal mainly in the direction of the gatepost 21*b*, is attached to the gatepost 21*a*. The scanning unit of the radar 20 starts scanning when it detects a new target, or the relative movement thereof as in the case of the above-described preferred embodiment. The new target is detected when a beat signal, which is generated by using the FMCW method, is detected in an upward modulation section and a downward modulation section. The relative movement of the target is detected by detecting the change of the beat signal frequency.

As shown in FIG. 6A, the scanning unit performs beam scanning over a predetermined angular range in a horizontal plane, or in a plane at a predetermined tilt angle (a depression angle or an elevation angle). Further, as shown in FIG. 6B, the scanning unit may perform beam scanning over a predetermined angular range in a vertical plane.

When the scanning unit is in the resting state, the beam is directed towards the direction of the gatepost 21*b*. When the target enters or passes the beam, the radar system 20 detects the target and starts beam scanning. When the beam scanning is performed in a horizontal direction as shown in FIG. 6A, the moving target can be captured over the scanning range. Accordingly, the target can be captured for a relatively long time. However, when the beam scanning is performed in a vertical direction as shown in FIG. 6B, the existence range of the target in the scanning range, that is, the height of the target can be detected. In this manner, it becomes possible to distinguish whether the target is a human or a small animal, or an adult or a child, for example.

In the above-described examples, a millimeter-wave radar for transmitting and receiving a millimeter-wave signal as a detection signal is exemplified. However, a laser radar system for scanning the direction of the laser-light beam by using a mirror can be used for the present invention.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A radar system comprising:
   a detection-control circuit for transmitting and receiving a detection signal and for detecting at least one of a relative position and a relative speed to a target;
   a scanning unit for scanning the direction of a beam of the detection signal over a predetermined range; and
   a beam-scanning control unit; wherein
      the beam-scanning control unit switches the state of the scanning unit between a resting state wherein the direction of the beam is fixed to a predetermined position while the detection-control circuit continues detection controlling, and a scanning state wherein the direction of the beam is scanned over a predetermined range.

2. A radar system according to claim 1, wherein the beam-scanning control unit switches the scanning unit into the scanning state when the moving speed of a vehicle in which the radar system is mounted is equal to or greater than a predetermined speed, and switches the scanning unit into the resting state when the moving speed is less than the predetermined speed.

3. A radar system according to claim 1, wherein the beam-scanning control unit switches the scanning unit into the scanning state when a vehicle in which the radar system is mounted is traveling on a highway, and switches the scanning unit into the resting state when the vehicle is not traveling on a highway.

4. A radar system according to claim 1, wherein the beam-scanning control unit switches the scanning unit into the scanning state when the detection-control circuit detects one of a new target and the relative movement of the target during the resting state of the scanning unit.

5. A radar system according to claim 1, wherein the direction of the beam scanned by the scanning unit is in one of a horizontal plane and a plane having a predetermined tilt angle.

6. A radar system according to claim 1, wherein the direction of the beam scanned by the scanning unit is in a substantially vertical plane.

7. A radar system according to claim 1, further comprising at least one of a vehicle-speed sensor, a car-navigation system, an electronic toll collection system, an ACC operation switch, an ACC controller, an engine-control unit, and a brake-control unit.

8. A radar system according to claim 1, wherein the detection control circuit includes a control circuit and a millimeter-wave circuit.

9. A radar system according to claim 8, wherein the millimeter-wave circuit modulates an oscillation frequency using an FMCW method by using a modulation signal received from the control circuit of the detection control circuit, outputs a transmission signal to an antenna via the scanning unit, and transmits a reception signal as an IF signal to the control circuit of the detection control circuit.

10. A radar system according to claim 9, wherein the control circuit of the detection control circuit transmits the modulation signal to the millimeter-wave circuit, obtains the relative distance and relative speed to the target on the basis of the IF signal received from the millimeter-wave circuit, and notifies an ACC controller of the relative distance and the relative speed.

11. A radar system according to claim 1, further comprising an antenna, wherein the scanning unit and the antenna define a directional coupler.

12. A radar system according to claim 1, wherein the scanning unit includes a movable lower conductor that is linearly movable so as to direct beams from an antenna over a predetermined range by a mechanical reciprocating movement.

13. A radar system according to claim 1, wherein switching between the scanning state and the resting state, and power-supply control for the scanning unit is automatically performed.

14. A vehicle comprising the radar system according to claim 1.

15. A movable apparatus comprising the radar system according to claim 1.

16. A fixed object comprising the radar system of claim 1.

17. The fixed object according to claim 16, wherein the fixed object includes a pair of gateposts and the radar system detects the presence of a movable object moving through the gateposts.

* * * * *